US011995984B2

United States Patent
Edwardson et al.

(10) Patent No.: US 11,995,984 B2
(45) Date of Patent: *May 28, 2024

(54) LOCATION-BASED MESSAGE DISTRIBUTION

(71) Applicant: Global Traffic Technologies, LLC, St. Paul, MN (US)

(72) Inventors: David Edwardson, Shoreview, MN (US); Samantha Edwardson, Fort Worth, TX (US)

(73) Assignee: Miovision Technologies Incorporated, Kitchener (CA)

(*) Notice: Subject to any disclaimer, the term of this patent is extended or adjusted under 35 U.S.C. 154(b) by 323 days.

This patent is subject to a terminal disclaimer.

(21) Appl. No.: 17/475,491

(22) Filed: Sep. 15, 2021

(65) Prior Publication Data

US 2024/0144817 A1 May 2, 2024

Related U.S. Application Data

(63) Continuation of application No. 16/788,716, filed on Feb. 12, 2020, now Pat. No. 11,158,189.

(51) Int. Cl.
*G08G 1/087* (2006.01)
*G08G 1/123* (2006.01)
*H04W 4/021* (2018.01)
*H04W 4/029* (2018.01)
*H04W 4/44* (2018.01)

(52) U.S. Cl.
CPC ............. *G08G 1/087* (2013.01); *G08G 1/123* (2013.01); *H04W 4/021* (2013.01); *H04W 4/029* (2018.02); *H04W 4/44* (2018.02)

(58) Field of Classification Search
CPC ....... G08G 1/087; G08G 1/123; H04W 4/021; H04W 4/029; H04W 4/44
See application file for complete search history.

(56) References Cited

U.S. PATENT DOCUMENTS 11,158,189 B2 * 10/2021 Edwardson ........... H04W 4/021

* cited by examiner

*Primary Examiner* — Daryl C Pope
(74) *Attorney, Agent, or Firm* — Stratford Group Ltd.

(57) ABSTRACT

According to the disclosed approaches, a first processor receives location messages from second processors. Each location message specifies published geographical coordinates that indicate a geographical location. The first processor accesses subscriptions to location topics in response to the location messages. The first processor determines whether or not the published geographical coordinates match any of the subscribed-to geographical coordinates. Matching location messages are transmitted to one or more third processors identified by the subscriptions.

30 Claims, 5 Drawing Sheets

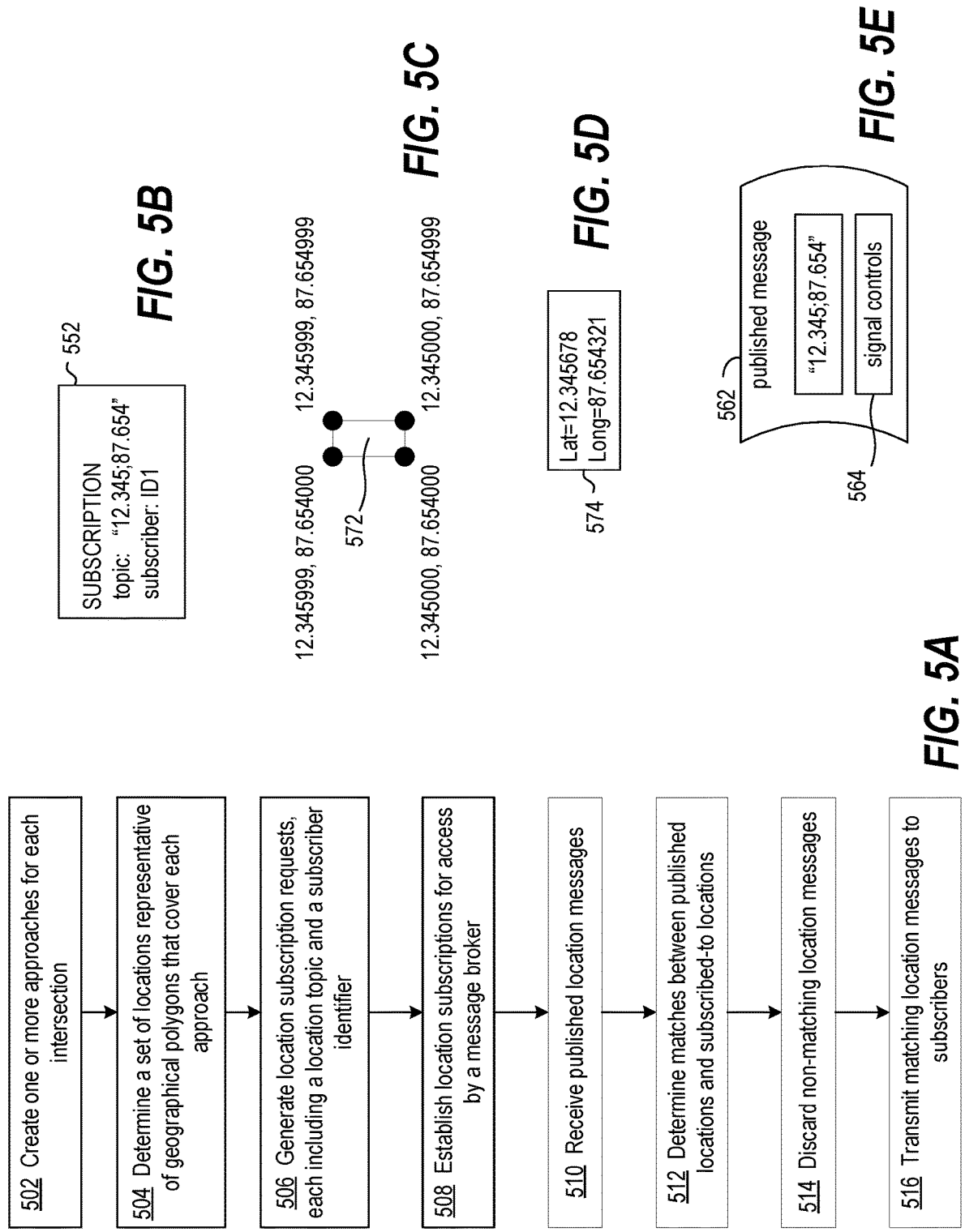

LOCATION-BASED MESSAGE DISTRIBUTION

FIELD OF THE INVENTION

The present invention is generally directed distribution of messages to subscribers based on locations of message publishers and subscriptions to location topics.

BACKGROUND

Traffic signals have long been used to regulate the flow of traffic at intersections. Generally, traffic signals have relied on timers or vehicle sensors to determine when to change traffic signal lights, thereby signaling alternating directions of traffic to stop, and others to proceed.

Emergency vehicles, such as police cars, fire trucks and ambulances, generally have the right to cross an intersection against a traffic signal. Emergency vehicles have in the past typically depended on horns, sirens and flashing lights to alert other drivers approaching the intersection that an emergency vehicle intends to cross the intersection. However, due to hearing impairment, air conditioning, audio systems and other distractions, often the driver of a vehicle approaching an intersection will not be aware of a warning being emitted by an approaching emergency vehicle.

Traffic control preemption systems assist authorized vehicles (police, fire and other public safety or transit vehicles) through signalized intersections by making a preemption request to the intersection controller. The controller will respond to the request from the vehicle by changing the intersection lights to green in the direction of the approaching vehicle or extending the green phase of a traffic light. This system improves the response time of public safety personnel, while reducing dangerous situations at intersections when an emergency vehicle is trying to cross on a red light. In addition, speed and schedule efficiency can be improved for transit vehicles. As used herein, traffic signal "preemption" will refer to both changing a traffic signal from red to green in response to signals from an emergency vehicle, and to extending the green phase of a traffic signal in response to signals from a transit vehicle.

There are presently a number of known traffic control preemption systems that have equipment installed at certain traffic signals and on authorized vehicles. One such system in use today is the OPTICOM® system. This system utilizes a high power strobe tube (emitter), located in or on the vehicle, that generates light pulses at a predetermined rate, typically 10 Hz or 14 Hz. A receiver, which includes a photo detector and associated electronics, is typically mounted on the mast arm located at the intersection and produces a series of voltage pulses, the number of which are proportional to the intensity of light pulses received from the emitter. The emitter generates sufficient radiant power to be detected from over 2500 feet away.

Intensity levels are associated with each intersection approach to determine when a detected vehicle is within range of the intersection. Vehicles with valid security codes and a sufficient intensity level are reviewed with other detected vehicles to determine the highest priority vehicle. Vehicles of equivalent priority are selected in a first come, first served manner. A preemption request is issued to the controller for the approach direction with the highest priority vehicle travelling on it.

Another common system in use today is the OPTICOM® GPS priority control system. This system utilizes a GPS receiver in the vehicle to determine location, speed, and heading of the vehicle. The information is combined with security coding information that consists of an agency identifier, vehicle class, and vehicle ID and is broadcast via a proprietary 2.4 GHz radio.

An equivalent 2.4 GHz radio located at the intersection along with associated electronics receives the broadcasted vehicle information. Approaches to the intersection are mapped using either collected GPS (Global Positioning System) readings from a vehicle traversing the approaches or using location information taken from a map database. The vehicle location and direction are used to determine on which of the mapped approaches the vehicle is approaching toward the intersection and the relative proximity to it. The speed and location of the vehicle are used to determine the estimated time of arrival (ETA) at the intersection and the travel distance from the intersection. ETA and travel distances are associated with each intersection approach to determine when a detected vehicle is within range of the intersection and, therefore, a preemption candidate. Preemption candidates with valid security codes are reviewed with other detected vehicles to determine the highest priority vehicle. Vehicles of equivalent priority are generally selected in a first come, first served manner. A preemption request is issued to the controller for the approach direction with the highest priority vehicle travelling on it.

With metropolitan-wide networks becoming more prevalent, additional means for detecting vehicles via wired networks such as Ethernet or fiber optics and wireless networks such as Mesh or IEEE 802.11b/g may be available. With network connectivity to the intersection, vehicle tracking information may be delivered over a network medium. In this instance, the vehicle location is either broadcast by the vehicle itself over the network or it may broadcast by an intermediary gateway on the network that bridges between, for example, a wireless medium used by the vehicle and a wired network on which the intersection electronics resides. In this case, the vehicle or an intermediary reports, via the network, the vehicle's security information, location, speed, and heading, along with the current time. Controllers at intersections and connected to the network receive the vehicle information and evaluate the position using approach maps as described in the OPTICOM® GPS system. The security coding could be identical to the OPTICOM® GPS system or employ another coding scheme.

SUMMARY

A disclosed method includes receiving by a first processor, location messages having information transmitted from a plurality of second processors. Each location message specifies published geographical coordinates that indicate a geographical location of one of the second processors. The method includes accessing a plurality of subscriptions to location topics in a storage arrangement by the first processor in response to receiving the location messages. Each location topic specifies subscribed-to geographical coordinates of a location. The method includes determining by the first processor for each received location message, whether or not the published geographical coordinates match any of the subscribed-to geographical coordinates. The method includes transmitting from the first processor to one or more third processors identified by one or more of the subscriptions, respectively, each location message having published geographical coordinates determined to match the subscribed-to geographical coordinates of the one or more subscriptions.

A disclosed system includes an arrangement of one or more first processors and a memory arrangement coupled to the one or more first processors. The memory arrangement is configured with instructions that when executed by the one or more first processors cause the one or more first processors to perform operations including receiving location messages having information transmitted from a plurality of second processors. Each location message specifies published geographical coordinates that indicate a geographical location of one of the second processors. The operations include accessing a plurality of subscriptions to location topics in a storage arrangement in response to receiving the location messages. Each location topic specifies subscribed-to geographical coordinates of a location. The operations include determining for each received location message, whether or not the published geographical coordinates match any of the subscribed-to geographical coordinates. The operations include transmitting to one or more third processors identified by one or more of the subscriptions, respectively, each location message having published geographical coordinates determined to match the subscribed-to geographical coordinates of the one or more subscriptions.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Various aspects and advantages of the invention will become apparent upon review of the following detailed description and upon reference to the drawings in which:

FIG. 5A shows a flowchart of a process by which subscriptions to location topics are used to manage the distribution of published location messages from vehicles;

FIG. 5B shows an example of information stored as a location subscription;

FIG. 5C shows an example of the geographical area implied by truncation of published geographic coordinates and subscribed-to coordinates;

FIG. 5D shows an example of raw geographical data prior to truncation for a published location message;

FIG. 5E shows an example of a published location message having truncated coordinates.

DETAILED DESCRIPTION

Figure 1:
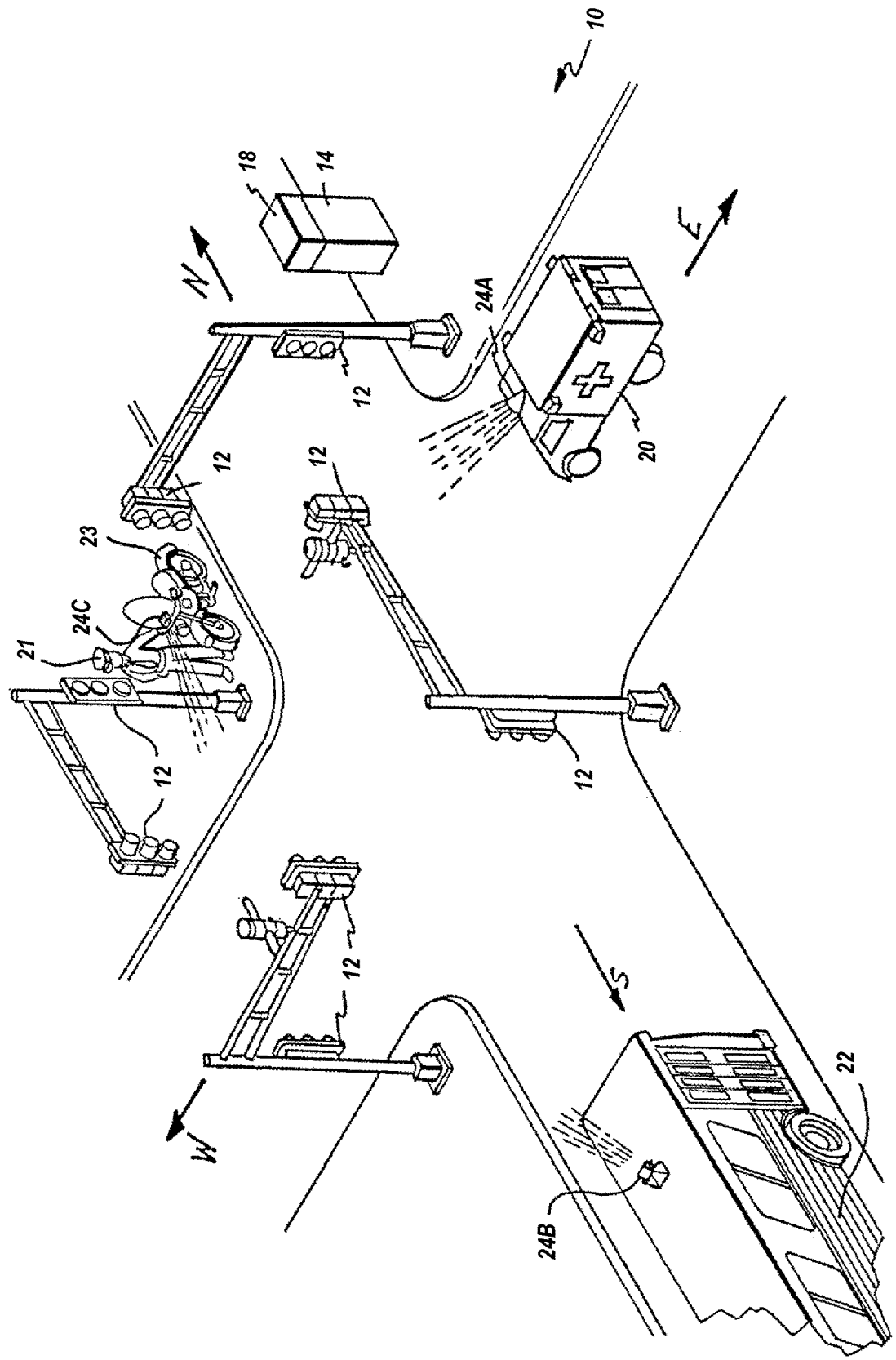
FIG. 1 is an illustration of a typical intersection having traffic signal lights.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Some traffic signal preemption systems, such as GPS-based systems, use approach maps in determining when to preempt a traffic signal. Generally, an approach map defines the boundaries of an area relative to an intersection. If an authorized vehicle is within the defined boundaries and communicates a preemption request to the phase selector at the intersection, preemption or priority can be granted if there is no competing, higher-priority request.

Determining whether or not a vehicle is within an area defined by an approach map can consume considerable processor resources. In addition, distributing messages having preemption requests over a network to intersection controllers can incur large data communication expenses.

Emergency, fleet, and transit vehicles can receive preemption or priority from a phase selector in order to remove or reduce the number of red lights encountered at intersections. If the vehicle always traverses a pre-defined route the relevant information as to when to request the service can reside on a vehicle control unit. However, if the vehicle drives a random route the vehicle control unit does not have the processing or storage power available to make requests as it would need to take into account all available possibilities.

One method to resolve the issue of unpredictable routes could be to make a request by a server on behalf of a vehicle. The vehicle control unit can transmit relative information such as location, heading, etc. to a centralized server, and the server could process the information and determine whether or not a request should be sent to a phase selector on behalf of the vehicle. A drawback to this method is that information transmitted from multiple vehicles to the server could overwhelm the server or introduce a delay in processing the vehicle message.

An alternative method can involve allocating processing units for processing requests for particular intersection controllers. Vehicle information could be sent directly by the vehicle control units to the processing units assigned to the intersections. However, the assigned processing units could also be overwhelmed if each had to process all telemetry data that arrived at the server. In addition, the cost charged for transferring the data would be costly.

The disclosed approaches can reduce processing and communication requirements associated with the processing of traffic signal preemption requests. In addition, the disclosed approaches can be employed in numerous other applications involving moving vehicles broadcasting their locations and one or more processing units interested in being alerted to the presence of the vehicles only when the vehicles are located in specific areas or spaces. For example, the disclosed approaches can be used in an application to warn pedestrians of approaching emergency vehicles, such as through equipment installed near roads or through portable communication devices (e.g., smartphones, tablets etc.). The disclosed approaches could also be used in an application to alert civilian vehicles of nearby emergency vehicles. In another application, a drone having no radar equipment could be alerted to nearby drones.

In the disclosed methods and systems, an arrangement of communicatively coupled processors are configured to implement a message transport involving subscription, publication, and brokerage based on subscriptions to location topics. Truncation of coordinates that specify a base location and a location of a vehicle are employed to determine whether or not the vehicle is within a geographic area implied by the base location. A subscriber processor can subscribe to receive published messages having location topics ("published locations") that match location topics specified in subscriptions ("subscribed-to locations"). Each of the locations can be specified as a pair of geographical coordinates, and both the truncated vehicle coordinates in published locations and the truncated base location coordinates in subscribed-to locations can be specified as character strings. Thus, determining whether or not a vehicle is within a particular geographic area can be accomplished by comparison of character strings.

A processor operating as a message broker receives location messages transmitted from processors operating as message publishers. Each location message specifies published geographical coordinates that indicate a geographical location of one of the message publishers. The published geographical coordinates are a version of actual geographical coordinates truncated from a first level of precision to a second level of precision. The broker processor determines whether published geographical coordinates match any of the subscribed-to locations. If a received location message has published geographical coordinates that are the same as subscribed-to geographical coordinates, the broker processor transmits the location message to each subscriber to the subscribed-to location. If the broker processor determines that the published location does not match any of the subscribed-to locations, the location message is discarded.

FIG. 1 is an illustration of a typical intersection 10 having traffic signal lights 12. The equipment at the intersection illustrates the environment in the disclosed approaches can be used. A traffic signal controller 14 sequences the traffic signal lights 12 to allow traffic to proceed alternately through the intersection 10. The intersection 10 can have equipment that is connected to a network through which preemption requests are conveyed.

The traffic control preemption system shown in FIG. 1 includes signal emitters 24A, 24B and 24C (also referred to herein as "vehicle control units"), a traffic signal controller 14, and a phase selector 18. In FIG. 1, an ambulance 20 and a bus 22 are approaching the intersection 10. The signal emitter 24A is mounted on the ambulance 20 and the signal emitter 24B is mounted on the bus 22. The signal emitters 24A and 24B each transmit location messages to a server (not shown) that is configured to operate as a message broker.

The message broker selectively transmits location messages to the phase selector 18 based on subscriptions to location topics made by the phase selector and on the location topics indicated in the location messages. The phase selector can process received location messages to determine security codes. Each security code can indicate the vehicle class and vehicle identification. The phase selector alternately issues preemption requests to and withdraws preemption requests from the traffic signal controller 14, and the traffic signal controller determines whether the preemption requests can be granted. The traffic signal controller may also receive preemption requests originating from other sources, such as a nearby railroad crossing, in which case the traffic signal controller may determine that the preemption request from the other source be granted before the preemption request from the phase selector. In some implementations the function of the phase selector can be performed solely by the traffic controller.

The phase selector determines the priority of each received preemption request and whether to preempt traffic control based on the security code. For example, the ambulance 20 may be given priority over the bus 22 since a human life may be at stake. Accordingly, the ambulance 20 would transmit a preemption request with a security code indicative of a high priority while the bus 20 would transmit a preemption request with a security code indicative of a low priority. The phase selector would discriminate between the low and high priority requests and request the traffic signal controller 14 to cause the traffic signal lights 12 controlling the ambulance's approach to the intersection to remain or become green and the traffic signal lights 12 controlling the bus's approach to the intersection to remain or become red.

Figure 2:
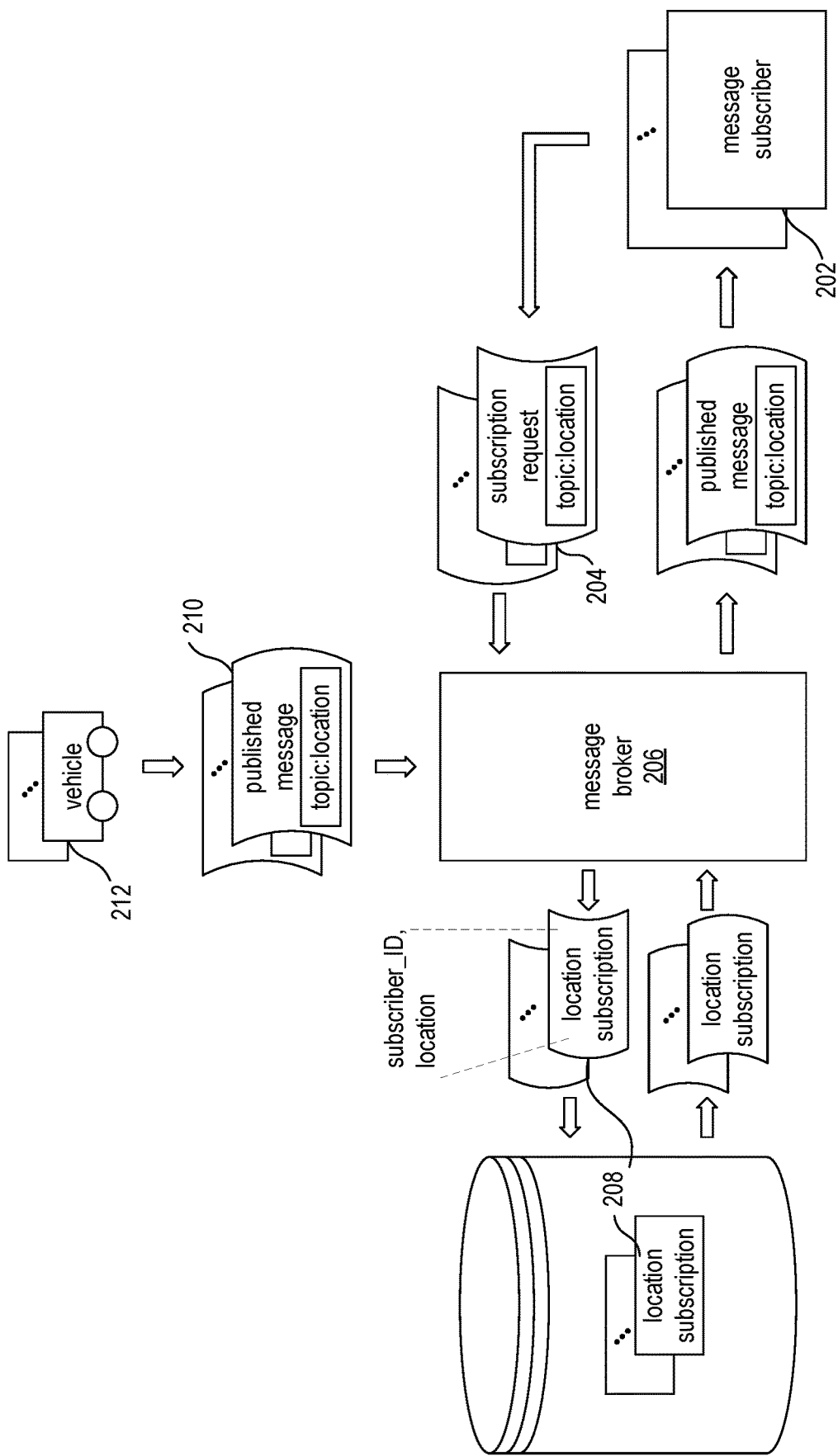
FIG. 2 shows a dataflow diagram of subscribers subscribing to location topics and brokering of published location messages according to the disclosed methods and systems.

FIG. 2 shows a dataflow diagram of subscribers subscribing to location topics and brokering of published location messages according to the disclosed methods and systems. Multiple message subscribers 202 can issue subscription requests 204 to a message broker 206. In one application, for example, each subscriber can be a processor of a phase selector that is disposed at an intersection for controlling traffic signals at the intersection.

Each subscription request specifies a geographical location as a message topic to which the subscriber seeks to subscribe. Each subscription request can additionally include a subscriber identifier, which the message broker can subsequently use to direct published messages. According to one application, each subscriber can be configured to generate multiple subscription requests, with each subscription request indicating a different location.

The set of locations subscribed to by a subscriber, such as a phase selector, can be interpreted to encompass the approaches to the intersection at which the phase selector is installed. Each approach covers an area of road leading to the intersection and defines an area in which preemption requests issued from the area are not ignored but are evaluated for possibly granting preemption.

The message broker 206 can be a server that receives the subscription requests 206 and stores location subscriptions 208 for subsequent retrieval when needed to evaluate a published message. The message broker can store the subscriptions to location topics in a database and access the subscriptions in the database for comparison to published messages. Each subscription specifies a location topic and a subscriber identifier. If multiple subscribers make subscriptions requests to the same location, the message broker will associate the subscriber identifiers of the subscribers with the same location. In one implementation, for example, a message transport such as the MQTT message transport protocol can be used to manage the subscriptions and brokering of messages.

In exemplary applications, the publishers of messages can be processors that are aboard moving vehicles 212. The processors transmit messages that specify current locations of the vehicles. The published messages 210 can include additional information depending on the application. For example, for traffic signal preemption applications, each published message can specify a vehicle class and/or a vehicle identifier, along with a priority request for seeking preemption of a traffic signal. As a vehicle is in motion, the onboard processor can send multiple published messages, each indicating a different location. In other applications, the vehicles can be other than those requesting traffic signal preemption. For example, the vehicles can be manned or unmanned aircraft, unmanned terrestrial vehicles, or self-driving terrestrial vehicles.

The message publishers 212 transmit messages wirelessly to the message broker 206. The wireless transmission can be through a metropolitan WiFi network or a cellular telephone network communicatively coupled to the message broker, for example.

Each vehicle has onboard equipment configured to determine the current location of the vehicle and transmit the location to the message broker. The onboard equipment can include a micro-processor programmed to coordinate the collection of location data and initiate the transmission of published messages. An onboard GPS module can repeatedly obtain GPS coordinates and provide the current coordinates to the micro-processor as the vehicle is moving. In some applications, the onboard equipment can include an altimeter that obtains and provides current, measured altitudes to the processor. The micro-processor can be coupled to an onboard radio transmitter for transmitting the published messages.

Each published message 210, which can be referred to as a location message, specifies a location, which is the published topic. The location can indicate a (then-current) geographical position of the vehicle. The geographical location can be specified as coordinates of latitude and longitude, either in decimal degrees or as degrees-minutes-seconds (DMS). In some applications, the location can include a value indicating the altitude, in combination with the geographical location.

The message broker 206 receives the published location messages and filters the messages according to the locations specified in the messages and subscriptions 208 to locations. The filtering of the messages involves the message broker determining for each received location message, whether or not the published geographical location specified in the message is the same as any of the subscribed-to locations 208.

For each published message the message broker 206 determines has a location topic that matches a subscribed-to location topic, the message broker transmits the published message to each subscriber to that location. Multiple subscribers can subscribe to the same location topic, and the message broker can send the published message to each of the subscribers. In an exemplary application, the phase selectors at different intersections can subscribe to the same location, and the message broker would send a matching message to each of the phase selectors. In response to determining that the location in a published message is outside all of the geographical areas derived from the location subscriptions 208, the message broker discards the message.

Figure 3:
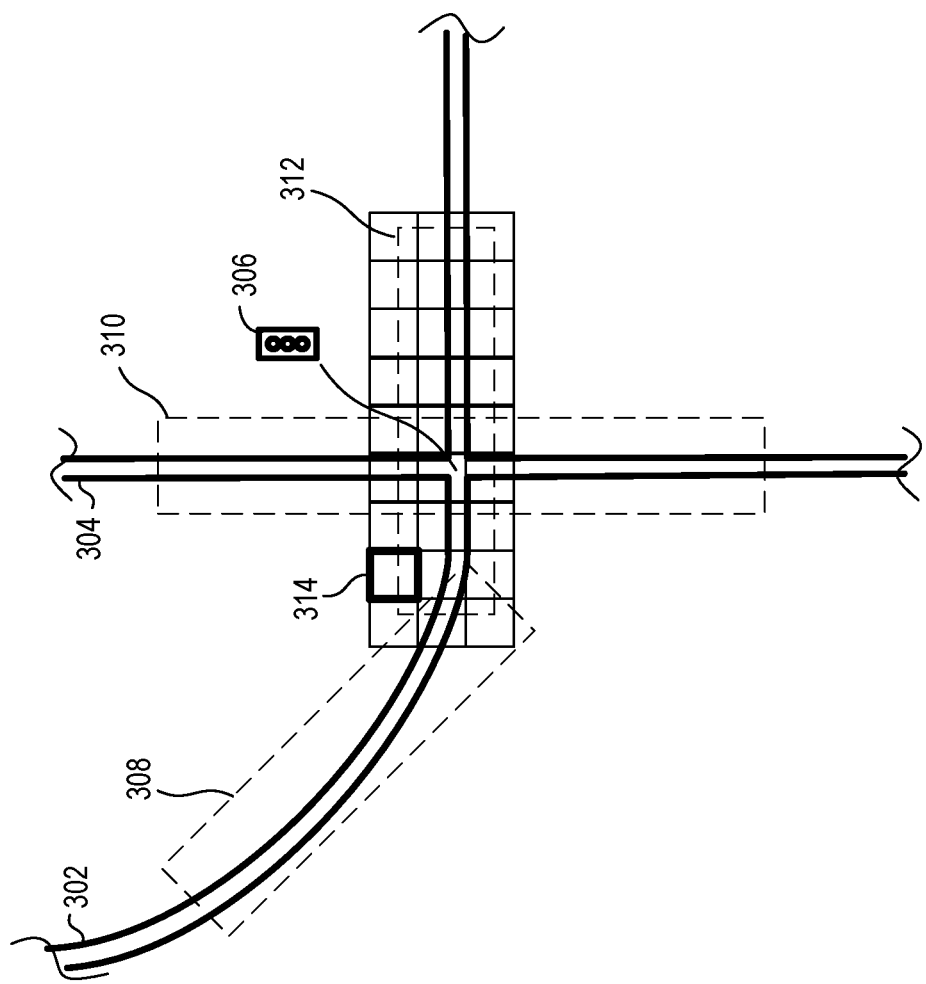
FIG. 3 shows an example of an intersection of roads at which a traffic signal arrangement controls traffic.

FIG. 3 shows an example of an intersection of roads 302 and 304 at which a traffic signal arrangement 306 controls traffic. The example shows multiple approaches 308, 310, and 312, each of which is defined by a dashed-line rectangle. Each approach is an area in which if an authorized vehicle is within the defined boundaries and communicates a preemption request to the phase selector, the preemption can be granted if there is no competing, higher-priority request.

Each approach can be implemented as multiple location subscriptions that implicitly cover the area of the approach. Each location subscription implies a geographic area, and the example illustrates for approach 312 the implied geographic areas as solid-line rectangles, of which the bold line rectangle 314 is an example. Though not shown, the approaches 308 and 310 can also be implemented by sets of multiple location subscriptions that imply multiple geographic areas that cover the areas of the approaches. Polygons other than rectangles could be used in other applications. For efficient computation in determining matches between published locations and subscribed-to locations, the rectangles implied by the subscribed-to locations have two parallel to geographic lines of latitude and two sides parallel to geographic lines of longitude.

Figure 4:
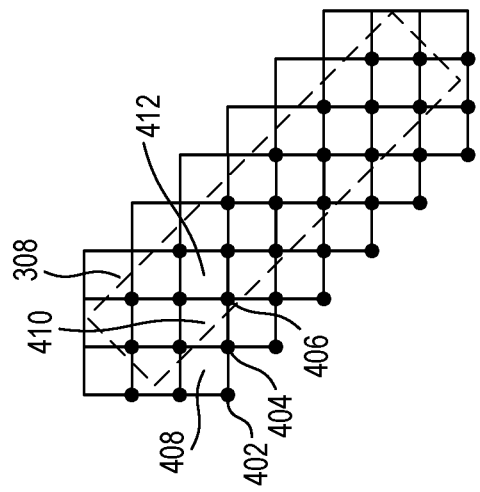
FIG. 4 shows an approach from FIG. 3 and the location subscriptions that implement the approach by way of the rectangles derived from the subscriptions.

FIG. 4 shows the approach 308 from FIG. 3 and the location subscriptions that implement the approach by way of geographical coordinates that imply rectangular areas that cover the approach. The location subscriptions that define an approach can be automatically generated either by a phase selector or by a configuration tool. An input specification of an approach defines the geographic area to be covered by the location subscriptions. The specification of the approach can be generated by a person interacting with a graphical user interface-based tool that allows drawing of a rectangle or some other object over a road leading to an intersection. The tool can execute on a central server or at a phase selector. Geographic information describing the roads and specified approaches can be determined from a geographic information system. The geographic specification of the approach can be stored in association with the identifier for a particular phase controller.

Once an approach has been specified, the location subscriptions can be determined and generated by tiling rectangles in an arrangement that covers the area bounded by the approach. The tiling can commence at an extreme point (latitudinally or longitudinally) on the boundary of the approach and proceed latitudinally and longitudinally until the area of the approach is covered. The process can be repeated for additional approaches to the intersection.

In an exemplary approach, the location of each location subscription can represent the corner of a fixed-size rectangular geographical area. For example, the black dots 402, 404, and 406 are the corners of rectangles 408, 410, and 412, respectively. A geographical area of a rectangle is implied by a subscribed-to location, because the level of precision of the raw coordinates determined onboard a vehicle are reduced by truncation to produce published coordinates that have the same level of precision as the subscribed-to coordinates. For example, the subscribed-to coordinates of a subscription can be 12.345 degrees latitude and 87.654 degrees longitude. The raw GPS coordinates could be 12.345678 and 87.654321 degrees longitude. Truncating the raw GPS coordinates to 5 levels of precision can produce published coordinates of 12.345 degrees latitude and 87.654 degrees longitude, which are the same as the subscribed-to coordinates. The subscribed-to coordinates imply a rectangular geographic area ranging from 12.345000 to 12.345000 degrees latitude and from 87.654000 to 87.654999 degrees longitude, because truncation of the raw GPS coordinates reduces the number of levels of precision from 8 to 5.

FIG. 5A shows a flowchart of a process by which subscriptions to location topics are used to manage the distribution of published location messages from vehicles. FIGS. 5B-5E show an example in which the process of FIG. 5A is applied to a location subscription and a published location message.

At block 502, according to one application, a GUI-based tool can be operated to create one or more approaches for each intersection. The specifications of the approaches can be input to a processor programmed that at block 504 determines for each approach, a set of locations that implement the approach based on polygons implied by the locations and covering the geographical area of the approach.

At block 506, a programmed processor can generate respective location subscription requests for the locations that implement the approaches. The subscription requests can be generated by a phase selector, for example, and transmitted to a server programmed to operate as a message broker. Each subscription request specifies a location, such as a latitude coordinate and a longitude coordinate, and an associated subscriber identifier. The subscriber identifier can identify and address the processing unit (e.g., phase detector) to which a published message is to be sent if the location topic in a published message matches location specified by the subscription.

The message broker at block 508 can establish location subscriptions in response to the subscription requests received from the subscribers. The message broker can store the location subscriptions in a storage arrangement including hard disk drives, solid state disks, and/or RAM. In some applications, the subscriptions may be transitory as the message subscriber may also be moving, and the locations of interest to the subscriber may change as the subscriber moves or changes location.

FIG. 5B shows an example of information stored as a location subscription 552. The example specifies a topic location of 12.345 degrees latitude, 87.654 degrees longitude, and a subscriber identifier of ID1. The subscriber information can also or alternatively include an address (not shown) for communication. In other applications, the topic can include an altitude (not shown). Notably, the topic location can be specified as the character string "12.345; 87.654" that represents the latitude and longitude coordinates.

FIG. 5C shows an example of the geographical area 572 implied by truncation of published geographic coordinates and subscribed-to coordinates. Notably, the coordinates that define the location in the subscription 552 are specified with a lesser degree of precision than are the coordinates of the implied geographical area 572. In the example, the subscribed-to location is 12.345 degrees latitude and 87.654 degrees longitude. The implied geographical area is the polygon having corners at (12.345000, 87.654000), (12.345000, 87.654999), (12.345999, 87.654999), and (12.345999, 87.654000). The geographical area is implied by additional levels of precision truncated from the raw latitude and longitude coordinates.

FIG. 5D shows an example of raw geographical data 574 prior to truncation for a published location message. The example shows 12.345678 degrees latitude and 87.654321 degrees longitude.

The raw geographical coordinates can be truncated, either by a processor onboard a vehicle or by a message server. FIG. 5E shows an example of a published location message 562 having truncated coordinates. The published messages communicates a location of 12.345 degrees latitude and 87.654 degrees longitude, which can be specified as the character string, "12.345;87.654." The published message can also include additional information, such as signal controls 564 that can be evaluated by a phase controller for determining whether to modify a phase of the traffic signal.

At block 510, the message broker receives published location messages. As indicated above, the location messages can be transmitted from the message publishers. Each location message has location information that indicates a geographical location of the message publisher. For some applications, the location message can also specify an altitude. The precision of the altitude in the published message can be truncated to have fewer levels of precision than the altitude measured by equipment onboard the vehicle.

At block 512, the message broker determines for each received published message, whether or not the location topic in the published message matches any of the subscribed-to locations. Matches can be determined by the message broker by comparing the character strings of the published locations to character strings that specify the subscribed-to locations.

At block 514, the message broker discards each received published message having a location topic determined to indicate a geographical location that does not match any of the subscribed-to locations. At block 516, the message broker transmits to one or more message subscribers, each location message determined to indicate a geographical location that matches the location topic of a location subscription. The message subscribers to which the published messages are sent are identified by the subscriber identifier in the matching subscription.

Figure 6:
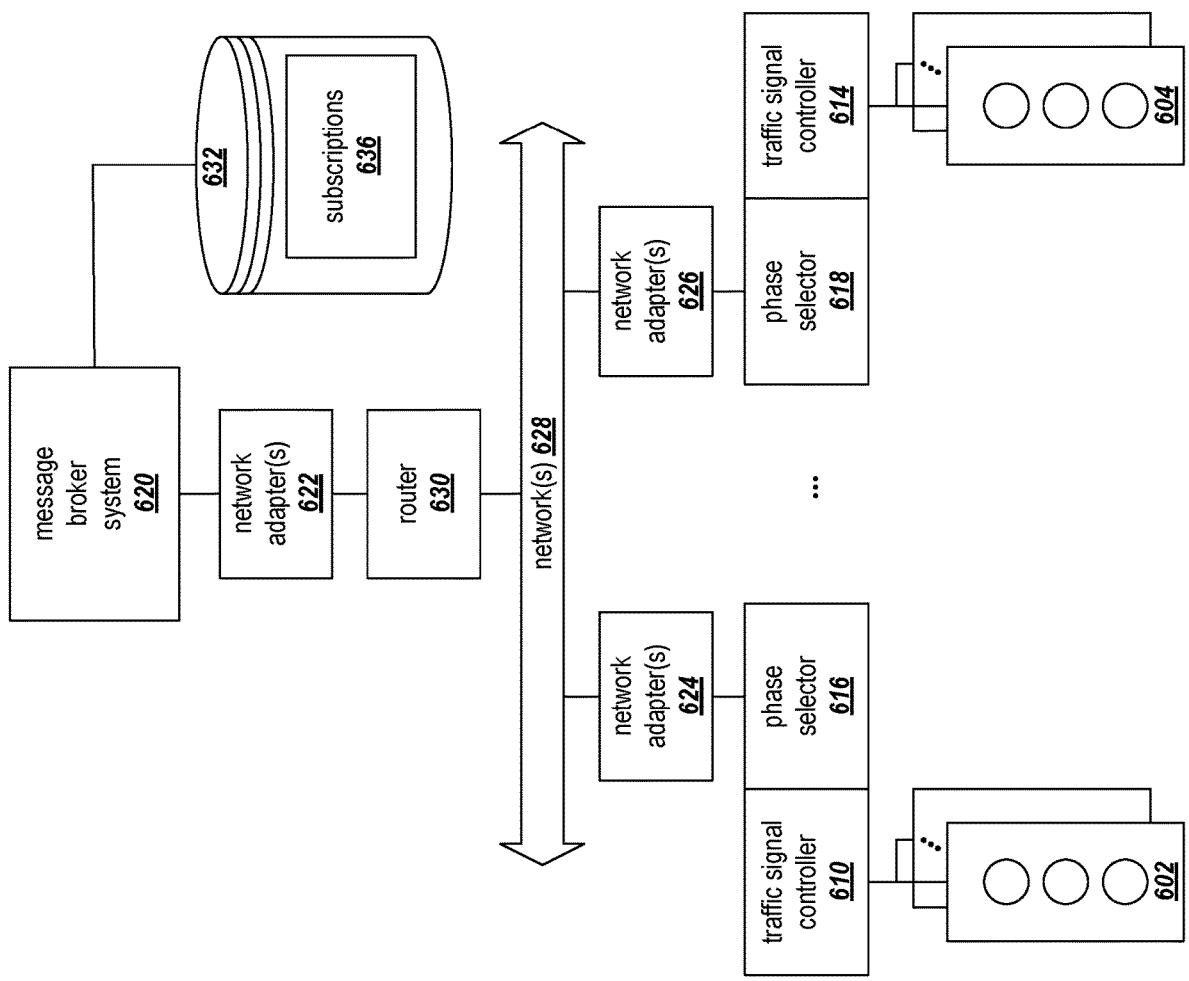
FIG. 6 is a block diagram of an exemplary system for selectively distributing location messages to phase selectors.

FIG. 6 is a block diagram of an exemplary system for selectively distributing location messages to phase selectors. Traffic lights 602 and 604 at intersections with phase selectors are coupled to traffic signal controllers 610 and 614, respectively. Traffic signal controllers 610 and 614 are connected to respective phase selectors 616 and 618. A message broker system 620 and the phase selectors are respectively coupled to network adapters 622, 624, and 626 for communication over a network 628. In various embodiments, a router or a network switch, as shown by router 630, may be coupled between the network adapter and the network. It is understood the message broker system 620 and the phase selectors 616 and 618 can be connected through more than one network, coupled by additional switches and routing resources, including a connection over the Internet.

The message broker system 620 is additionally coupled to a storage arrangement 632, which stores location subscriptions 636. Each subscription is associated with one or more of the phase selectors 616 or 618. It will be recognized that storage arrangement 732 can comprise several local and/or remote servers and one or more databases.

It is understood that numerous network transfer protocols may be used to establish, maintain, and route connections including: TCP/IP, UDP, NFS, ESP, SPX, etc. It is also understood that network transfer protocols may utilize one or more lower layers of protocol communication such as ATM, X.25, or MTP, and on various physical and wireless networks such as, Ethernet, ISDN, ADSL, SONET, IEEE 802.11, V.90/v92 analog transmission, etc.

The processes of the message publishers, message broker, and message subscribers can be implemented as arrangements of micro-processors and computer processors programmed to perform the operations described herein. Those skilled in the art will appreciate that various alternative computing arrangements, including one or more processors and a memory arrangement configured with program code, would be suitable for hosting the processes and data structures and implementing the algorithms of the different embodiments of the present invention. The computer code, comprising the processes of the present invention encoded in a processor executable format, may be stored and provided via a variety of computer-readable storage media or delivery channels such as magnetic or optical disks or tapes, electronic storage devices, or as application services over a network.

Various logic may be implemented as circuitry to carry out one or more of the operations and activities described herein and/or shown in the figures. In these contexts, a circuit or circuitry may be referred to as a "processor," "logic," "module," "engine," block," or "unit." It should be understood that processors logic, modules, engines, blocks and units are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

The present invention is thought to be applicable to a variety of systems for a phase selector. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method, comprising:
   receiving by a first processor, location messages having information transmitted from a plurality of second processors, wherein each location message specifies published geographical coordinates that indicate a geographical location of one of the second processors;
   accessing a plurality of subscriptions to location topics in a storage arrangement by the first processor in response to receiving the location messages, wherein each location topic specifies subscribed-to geographical coordinates of a location;
   determining by the first processor for each received location message, whether or not the published geographical coordinates match any of the subscribed-to geographical coordinates; and
   transmitting from the first processor to one or more third processors identified by one or more of the subscriptions, respectively, each location message having published geographical coordinates determined to match the subscribed-to geographical coordinates of the one or more subscriptions.

2. The method of claim 1, wherein:
   each location message includes vehicle identification data for evaluation by the one or more third processors for selectively modifying phases of traffic lights; and
   the transmitting includes transmitting the location messages to the one or more third processors that are disposed at one or more intersections for controlling the traffic lights.

3. The method of claim 2, wherein:
   a plurality of third processors are disposed at a plurality of intersections, respectively, the plurality of third processors includes the one or more third processors, and the plurality of intersections includes the one or more intersections;
   for each intersection of the plurality of intersections:
      a subset that includes multiple ones of the plurality of subscriptions defines an approach to the intersection; and
      each location subscription of the subset identifies the respective third processor of the plurality of third processors disposed at the intersection; and
   the determining includes determining whether or not the published geographical coordinates match the subscribed-to geographical coordinates of the multiple ones of the location subscriptions.

4. The method of claim 1, wherein the subscribed-to geographical coordinates of each location topic include one latitude coordinate and one longitude coordinate, and the one latitude coordinate and one longitude coordinate are representative of a geographical area.

5. The method of claim 4, wherein the geographical area is a rectangle.

6. The method of claim 5, wherein the rectangle has first sides that are parallel to geographic lines of latitude and second sides that are parallel to geographic lines of longitude.

7. The method of claim 1, wherein:
   the subscribed-to geographical coordinates of each location topic include one latitude coordinate, one longitude coordinate, and one altitude value; and
   the published geographical coordinates of each location message specify one latitude coordinate, one longitude coordinate, and one altitude value.

8. The method of claim 1, wherein the receiving includes receiving by the first processor, location messages transmitted wirelessly from the plurality of second processors that are onboard a plurality of moving vehicles, each location message having location information that indicates a geographical location of one of the moving vehicles.

9. The method of claim 1, wherein the transmitting includes transmitting each location message to the one or more third processors that are onboard a plurality of moving vehicles.

10. The method of claim 9, wherein the receiving includes receiving by the first processor, location messages transmitted wirelessly from the plurality of second processors that disposed at a plurality of intersections, each location message having location information that indicates a geographical location of one of the intersections.

11. The method of claim 1, wherein:
   the published geographical coordinates are a version of actual geographic coordinates truncated from a first level of precision to a second level of precision; and
   each location topic specifies subscribed-to geographical coordinates of a location in the second level of precision.

12. The method of claim 11, wherein:
   the subscribed-to geographical coordinates of each location topic include one latitude coordinate in the second level of precision, one longitude coordinate, in the second level of precision, and one altitude coordinate specified in a third level of precision; and
   the published geographical coordinates of each location message specify one latitude coordinate, one longitude coordinate, and an altitude in the third level of precision that is truncated from a fourth level of precision of a measured altitude.

13. The method of claim 11, further comprising truncating by the plurality of second processors, one or more levels of precision from the geographical coordinates having the first level of precision to generate the published geographical coordinates having to the second level of precision.

14. The method of claim 11, further comprising:
   receiving by a message server, the information transmitted from the plurality of second processors, wherein the information includes geographical coordinates having the first level of precision;
   truncating by the message server, one or more levels of precision from the geographical coordinates having the first level of precision to generate the published geographical coordinates having to the second level of precision; and
   providing the location messages to the first processor.

15. The method of claim 11, wherein:
   the receiving location messages includes receiving the published geographical coordinates specified as a character string;

the accessing subscriptions includes accessing the subscribed-to geographical coordinates specified as a character string; and
the determining includes comparing the character string that specifies the published geographical coordinates to the character string that specifies the subscribed-to geographical coordinates.

16. The method of claim 1, wherein:
the receiving location messages includes receiving the published geographical coordinates specified as a character string;
the accessing subscriptions includes accessing the subscribed-to geographical coordinates specified as a character string; and
the determining includes comparing the character string that specifies the published geographical coordinates to the character string that specifies the subscribed-to geographical coordinates.

17. A system comprising:
an arrangement of one or more first processors;
a memory arrangement coupled to the one or more first processors and configured with instructions that when executed by the one or more first processors cause the one or more first processors to perform operations including:
  receiving location messages having information transmitted from a plurality of second processors, wherein each location message specifies published geographical coordinates that indicate a geographical location of one of the second processors;
  accessing a plurality of subscriptions to location topics in a storage arrangement in response to receiving the location messages, wherein each location topic specifies, subscribed-to geographical coordinates of a location;
  determining for each received location message, whether or not the published geographical coordinates match any of the subscribed-to geographical coordinates; and
  transmitting to one or more third processors identified by one or more of the subscriptions, respectively, each location message having published geographical coordinates determined to match the subscribed-to geographical coordinates of the one or more subscriptions.

18. The system of claim 17, wherein:
each location message includes vehicle identification data for evaluation by the one or more third processors for selectively modifying phases of traffic lights; and
the instructions for transmitting include instructions that cause the one or more first processors to transmit the location messages to the one or more third processors that are disposed at one or more intersections for controlling the traffic lights.

19. The system of claim 18, wherein:
for each intersection of the plurality of intersections:
a subset that includes multiple ones of the plurality of subscriptions defines an approach to the intersection; and
  each location subscription of the subset identifies a respective third processor of a plurality of third processors disposed at a plurality of intersections, the plurality of third processors includes the one or more third processors, and the plurality of intersections includes the one or more intersections; and
the instructions for determining include instructions that cause the one or more first processors to determine whether or not the published geographical coordinates match the subscribed-to geographical coordinates of the multiple ones of the location subscriptions.

20. The system of claim 17, wherein the subscribed-to geographical coordinates of each location topic include one latitude coordinate and one longitude coordinate, and the one latitude coordinate and one longitude coordinate are representative of a geographical area.

21. The system of claim 20, wherein the geographical area is a rectangle.

22. The system of claim 21, wherein the rectangle has first sides that are parallel to geographic lines of latitude and second sides that are parallel to geographic lines of longitude.

23. The system of claim 17, wherein the instructions for receiving include instructions that cause the one or more first processors to receive location messages transmitted wirelessly from the plurality of second processors that are onboard a plurality of moving vehicles, each location message having location information that indicates a geographical location of one of the moving vehicles.

24. The system of claim 17, wherein the instructions for transmitting include instructions that cause the one or more first processors to transmit each location message to the one or more third processors that are onboard a plurality of moving vehicles.

25. The system of claim 24, wherein the instructions for receiving include instructions that cause the one or more first processors to receive location messages transmitted wirelessly from the plurality of second processors that disposed at a plurality of intersections, each location message having location information that indicates a geographical location of one of the intersections.

26. The system of claim 17, wherein:
the subscribed-to geographical coordinates of each location topic include one latitude coordinate, one longitude coordinate, and one altitude value; and
the published geographical coordinates of each location message specify one latitude coordinate, one longitude coordinate, and one altitude value.

27. The system of claim 17, wherein:
the published geographical coordinates are a version of actual geographic coordinates truncated from a first level of precision to a second level of precision; and
each location topic specifies subscribed-to geographical coordinates of a location in the second level of precision.

28. The system of claim 27, wherein:
the subscribed-to geographical coordinates of each location topic include one latitude coordinate in the second level of precision, one longitude coordinate in the second level of precision, and one altitude coordinate specified in a third level of precision; and
the published geographical coordinates of each location message specify one latitude coordinate, one longitude coordinate, and an altitude in the third level of precision that is truncated from a fourth level of precision of a measured altitude.

29. The system of claim 27, wherein the memory arrangement is further configured instructions that when executed by the one or more first processors cause the one or more first processors to perform operations including:
  receiving information transmitted from the plurality of second processors, wherein the information includes geographical coordinates having the first level of precision;

truncating one or more levels of precision from the geographical coordinates having the first level of precision to generate the published geographical coordinates having to the second level of precision; and providing the location messages.

30. The system of claim 17, wherein:

the instructions for receiving location messages include instructions that cause the one or more first processors to receive the published geographical coordinates specified as a character string;

the instructions for accessing subscriptions include instructions that cause the one or more first processors to access the subscribed-to geographical coordinates specified as a character string; and the instructions for determining include instructions that cause the one or more first processors to compare the character string that specifies the published geographical coordinates to the character string that specifies the subscribed-to geographical coordinates.

* * * * *